United States Patent
Sebastian et al.

(10) Patent No.: US 10,064,429 B2
(45) Date of Patent: Sep. 4, 2018

(54) MIXED FIBER PRODUCT FOR USE IN THE MANUFACTURE OF CIGARETTE FILTER ELEMENTS AND RELATED METHODS, SYSTEMS, AND APPARATUSES

(75) Inventors: Andries D. Sebastian, Clemmons, NC (US); Huamin Gan, Clemmons, NC (US); Kenneth C. Deloach, Pfafftown, NC (US); Richard L. Sizemore, Clemmons, NC (US); Dean M. Vick, Clemmons, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 1418 days.

(21) Appl. No.: 13/241,399

(22) Filed: Sep. 23, 2011

(65) Prior Publication Data
US 2013/0074853 A1 Mar. 28, 2013

(51) Int. Cl.
*A24D 3/02* (2006.01)
*A24D 3/08* (2006.01)
(Continued)

(52) U.S. Cl.
CPC ............ *A24D 3/08* (2013.01); *A24D 3/0204* (2013.01); *A24D 3/0233* (2013.01); *A24D 3/063* (2013.01);
(Continued)

(58) Field of Classification Search
CPC ...... A24D 3/0233; A24D 3/063; A24D 3/064; A24D 3/065; A24D 3/067; A24D 3/068;
(Continued)

(56) References Cited

U.S. PATENT DOCUMENTS 2,812,767 A * 11/1957 Machenry .............. A24D 3/022
131/200
2,881,770 A 4/1959 Touey
(Continued)

FOREIGN PATENT DOCUMENTS

EP 2 160 107 3/2010
GB 757283 9/1956
(Continued)

OTHER PUBLICATIONS

International Search Report and Written Opinion of the International Searching Authority issued in corresponding International Application No. PCT/US2012/056232, dated Apr. 19, 2013.
(Continued)

*Primary Examiner* — Michael A Tolin
(74) *Attorney, Agent, or Firm* — Womble Bond Dickinson (US) LLP

(57) ABSTRACT

A system configured to produce smokable products including filter elements formed from multiple fibers is provided. The system includes a texturing apparatus configured to combine the fibers such that the fibers are at least partially entangled with each other and form a mixed fiber product. The entangled fibers may be sufficiently separated from one another such that plasticizer may be applied to the mixed fiber product without necessarily performing tow opening, crimp removal, or blooming operations. The fibers combined to form the mixed fiber product may define characteristics that differ or which are the same. Accordingly, filter elements may be produced that include different fibers that have respective desirable properties associated therewith. Related methods, apparatuses and mixed fiber products are also provided by the disclosure.

21 Claims, 6 Drawing Sheets

(51) Int. Cl.
*A24D 3/10* (2006.01)
*D02J 1/08* (2006.01)
*B29C 55/30* (2006.01)
*A24D 3/06* (2006.01)

(52) U.S. Cl.
CPC ............... *A24D 3/065* (2013.01); *A24D 3/10* (2013.01); *B29C 55/30* (2013.01); *D02J 1/08* (2013.01)

(58) Field of Classification Search
CPC . A24D 3/08; A24D 3/10; A24D 3/163; A24D 3/0204; B29C 55/30; B32B 5/08; D02J 1/08
See application file for complete search history.

(56) References Cited

U.S. PATENT DOCUMENTS

| | | | |
|---|---|---|---|
| 3,039,908 A | | 6/1962 | Parmele |
| 3,111,702 A | * | 11/1963 | Berger .................. A24D 3/0233 131/207 |
| 3,119,396 A | | 1/1964 | Tanquary |
| 3,224,453 A | | 12/1965 | Mahoney et al. |
| 3,253,396 A | | 5/1966 | Fish, Sr. |
| 3,288,147 A | | 11/1966 | Molins et al. |
| 3,328,863 A | | 7/1967 | Cobb et al. |
| 3,381,346 A | | 5/1968 | Benson |
| 3,424,172 A | | 1/1969 | Neurath |
| 3,553,953 A | | 1/1971 | Ponson |
| 3,724,199 A | * | 4/1973 | Armstrong ............... D02G 3/28 28/245 |
| 3,775,958 A | * | 12/1973 | Lloyd .................... D01H 1/115 28/271 |
| 3,915,176 A | | 10/1975 | Heitmann et al. |
| 4,068,358 A | | 1/1978 | Luther |
| 4,125,922 A | | 11/1978 | Irwin |
| 4,173,504 A | * | 11/1979 | Tomioka et al. ............. 156/180 |
| 4,174,719 A | | 11/1979 | Martin et al. |
| 4,182,348 A | | 1/1980 | Seehofer et al. |
| 4,195,649 A | | 4/1980 | Noguchi |
| 4,291,713 A | | 9/1981 | Frank |
| 4,338,776 A | | 7/1982 | Krenzer |
| 4,368,688 A | * | 1/1983 | Grumer .................. A24D 3/022 118/325 |
| 4,379,465 A | | 4/1983 | Coq |
| 4,468,845 A | | 9/1984 | Harris |
| 4,474,190 A | | 10/1984 | Brand |
| 4,549,875 A | | 10/1985 | Pryor |
| 4,559,772 A | | 12/1985 | Heinrich et al. |
| 4,574,816 A | | 3/1986 | Rudszinat |
| 4,736,754 A | | 4/1988 | Heitmann et al. |
| 4,756,318 A | | 7/1988 | Clearman et al. |
| 4,811,745 A | | 3/1989 | Cohen |
| 4,878,506 A | | 11/1989 | Pinck et al. |
| 4,925,602 A | | 5/1990 | Hill |
| 5,012,823 A | | 5/1991 | Keritsis et al. |
| 5,056,200 A | | 10/1991 | Schwartz |
| 5,060,665 A | | 10/1991 | Heitmann |
| 5,156,169 A | | 10/1992 | Holmes |
| 5,225,277 A | | 7/1993 | Takegawa |
| 5,271,419 A | | 12/1993 | Arzonica et al. |
| 5,275,859 A | | 1/1994 | Phillips et al. |
| 5,387,285 A | | 2/1995 | Rivers |
| 5,509,430 A | * | 4/1996 | Berger .................. A24D 3/065 131/341 |
| 5,783,505 A | | 7/1998 | Duckett |
| 5,839,448 A | | 11/1998 | Woodings |
| 5,970,988 A | | 10/1999 | Buchanan et al. |
| 6,045,908 A | | 4/2000 | Nakajima |
| 6,080,457 A | | 6/2000 | Charlton et al. |
| 6,087,465 A | | 7/2000 | Seppälä et al. |
| 6,360,751 B1 | | 3/2002 | Fagg et al. |
| 6,543,106 B1 | * | 4/2003 | Ames et al. .................... 28/283 |
| 6,571,802 B1 | * | 6/2003 | Yamashita .................... 131/332 |
| 6,706,361 B1 | | 3/2004 | Economy et al. |
| 6,739,344 B2 | | 5/2004 | Yamashita |
| 6,984,631 B2 | | 1/2006 | Aranishi et al. |
| 6,997,190 B2 | | 2/2006 | Stokes |
| 7,115,085 B2 | | 10/2006 | Deal |
| 7,425,289 B2 | | 9/2008 | Sanderson |
| 8,973,588 B2 | | 3/2015 | Sebastian et al. |
| 2003/0136419 A1 | | 7/2003 | Muller |
| 2003/0200973 A1 | | 10/2003 | Xue |
| 2003/0213496 A1 | | 11/2003 | Wolff et al. |
| 2005/0011529 A1 | | 1/2005 | Horn et al. |
| 2007/0284034 A1 | | 12/2007 | Fathi et al. |
| 2008/0029118 A1 | | 2/2008 | Nelson et al. |
| 2008/0245377 A1 | | 10/2008 | Marshall |
| 2008/0295852 A1 | | 12/2008 | Riepert et al. |
| 2009/0288667 A1 | | 11/2009 | Andresen et al. |
| 2009/0288669 A1 | | 11/2009 | Hutchens |
| 2009/0288672 A1 | | 11/2009 | Hutchens |
| 2010/0122708 A1 | | 5/2010 | Sears |
| 2010/0236561 A1 | | 9/2010 | Barnes et al. |
| 2011/0023900 A1 | | 2/2011 | Clarke et al. |
| 2011/0036366 A1 | | 2/2011 | Sebastian |
| 2012/0000479 A1 | | 1/2012 | Sebastian |
| 2012/0024304 A1 | | 2/2012 | Sebastian |

FOREIGN PATENT DOCUMENTS

| | | |
|---|---|---|
| GB | 1269974 | 4/1972 |
| GB | 1420655 | 1/1976 |
| JP | 54-151199 A | 11/1979 |
| JP | 5-211860 A | 8/1993 |
| JP | 11-279201 A | 10/1999 |
| WO | WO 1993/05868 | 4/1993 |
| WO | WO 95/24520 | 9/1995 |
| WO | WO 95/35044 | 12/1995 |
| WO | 99/26496 A2 | 6/1999 |
| WO | WO 2009/000453 | 12/2008 |
| WO | WO 2012/016051 | 2/2012 |

OTHER PUBLICATIONS

International Preliminary Report on Patentability from corresponding International Application No. PCT/US2012/056232, dated Jan. 20, 2014.
AIRTEX™ by TECHNISERVICE® Brochure http://www.techniservice.com/pdf_files/Techniservice_Airtex.pdf.
European Examination Report for Application No. 12 775 086.7 dated Nov. 9, 2015.

* cited by examiner

MIXED FIBER PRODUCT FOR USE IN THE MANUFACTURE OF CIGARETTE FILTER ELEMENTS AND RELATED METHODS, SYSTEMS, AND APPARATUSES

FIELD OF THE DISCLOSURE

The present disclosure relates to products made or derived from tobacco or other smokable material that are intended for human consumption. In particular, the disclosure relates to filter elements for smoking articles such as cigarettes, and related methods and apparatuses for producing filter elements.

BACKGROUND

Popular smoking articles, such as cigarettes, may have a substantially cylindrical rod-shaped structure and may include a charge, roll or column of smokable material, such as shredded tobacco (e.g., in cut filler form), surrounded by a paper wrapper, thereby forming a so-called "smokable rod" or "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Typically, the filter element is attached to one end of the tobacco rod using a circumscribing wrapping material known as "tipping material." It also may be desirable to perforate the tipping material and plug wrap, in order to provide dilution of drawn mainstream smoke with ambient air. Descriptions of cigarettes and the various components thereof are set forth in Tobacco Production, Chemistry and Technology, Davis et al. (Eds.) (1999). A cigarette is employed by a smoker by lighting one end thereof and burning the tobacco rod. The smoker then receives mainstream smoke into his/her mouth by drawing on the opposite end (e.g., the filter end) of the cigarette.

Certain filter elements for cigarettes contain materials that alter the chemical composition or sensory characteristics of mainstream smoke. For example, it is known to incorporate certain adsorbent materials into a filter element, such as activated carbon or charcoal materials (collectively, carbonaceous materials) in particulate or granular form. Granules of carbonaceous material can be incorporated into "dalmatian" types of filter regions using the general types of techniques used for traditional dalmatian filter manufacture. Techniques for production of dalmatian filters are known, and representative dalmatian filters have been provided commercially by Filtrona Greensboro Inc. Alternatively, granules of carbonaceous material can be incorporated into "cavity" types of filter regions using the general types of techniques used for traditional "cavity" filter manufacture. Various types of filters incorporating charcoal particles or activated carbon types of materials are set forth in U.S. Pat. No. 2,881,770 to Touey; U.S. Pat. No. 3,101,723 to Seligman et al.; U.S. Pat. No. 3,236,244 to Irby et al.; U.S. Pat. No. 3,311,519 to Touey et al.; U.S. Pat. No. 3,313,306 to Berger; U.S. Pat. No. 3,319,629 to Chamberlain; U.S. Pat. No. 3,347,247 to Lloyd; U.S. Pat. No. 3,349,780 to Sublett et al.; U.S. Pat. No. 3,370,595 to Davis et al.; U.S. Pat. No. 3,413,982 to Sublett et al.; U.S. Pat. No. 3,551,256 to Watson; U.S. Pat. No. 3,602,231 to Dock; U.S. Pat. No. 3,904,577 to Buisson; U.S. Pat. No. 3,972,335 to Tigglebeck et al.; U.S. Pat. No. 5,360,023 to Blakley et al.; U.S. Pat. No. 5,909,736 to Stpyridis; and U.S. Pat. No. 6,537,186 to Veluz; US Pat. Publication Nos. 2003/0034085 to Spiers et al.; 2003/0106562 to Chatterjee; 2005/0066982 to Clark et al; 2006/0025292 to Hicks et al.; 2007/0056600 to Coleman, III et al.; 2008/0142028 to Fagg; 2008/0173320 to Dunlap et al.; 2008/0295853 to Jones; 2009/0288672 to Hutchens; PCT WO 2006/064371 to Banerjea et al.; PCT WO 2006/051422 to Jupe et al.; and PCT WO2006/103404 to Cashmore et al., which are incorporated herein by reference.

Various methods and apparatuses have been developed to manufacture filter elements containing fibrous tow material combined with an adsorbent material or other particulate additive. For example, techniques for production of dalmatian filters are known, and representative dalmatian filters have been provided commercially by Filtrona Greensboro Inc. Carbon particles can be incorporated into cavity types of filter regions using the general types of techniques used for traditional cavity filter manufacture. See, for example, the types of equipment and techniques that can be used for, or suitably modified for use for, incorporating materials into filters that are set forth in U.S. Pat. No. 3,844,200 to Sexstone; U.S. Pat. No. 4,016,830 to Sexstone; U.S. Pat. No. 4,214,508 to Washington; U.S. Pat. No. 4,425,107 to Hall; U.S. Pat. No. 4,411,640 to Hall; U.S. Pat. No. 5,322,495 to Budjinski II et al; U.S. Pat. No. 6,656,412 to Ercelebi et al and U.S. Pat. No. 6,837,281 to Spiers et al.; which are incorporated herein by reference. Other arrangements for inserting objects into filter material are disclosed, for example, in U.S. Pat. No. 4,281,671 to Byrne et al. and U.S. Pat. No. 7,115,085 to Deal; US Pat. Appl. Pub. Nos. 2007/0068540 to Thomas et al.; 2008/0029118 to Nelson et al.; 2008/0142028 to Fagg; 2008/0302373 to Stokes et al; 2009/0288667 to Andresen et al.; 2009/0288672 to Hutchens and 2010/0101589 to Nelson et al.; and U.S. patent application Ser. No. 12/407,260, filed Mar. 19, 2009, which are incorporated herein by reference.

The currently available filter technology for incorporation of a particulate additive into a filter element may suffer from several drawbacks. For example, cavity filters that include a particulate additive in a free state, such as activated carbon particles, may potentially result in contamination of mainstream smoke and may also suffer from channeling of smoke around the loose bed of particles in the cavity. In addition, manufacturing methods for incorporating particulate additives in cavity filters may be challenging due to the potential for particulate dust clouds to form during the manufacturing process. Further, affixing a particulate adsorbent within a fibrous tow may involve use of a plasticizer or other adhesive material to adhere the particles within the fibrous mass, which may lead to deactivation of the adsorbent due to contamination of the surface of the particles by the plasticizer or adhesive.

Thus, use of filter elements incorporating particulate additives may suffer from drawbacks. In this regard, U.S. patent application Ser. No. 12/847,228 to Sebastian filed Jul. 30, 2010, which is incorporated herein by reference, discloses multifunctional filter elements that provide multiple different mechanisms for filtration of mainstream smoke without the need for absorbent materials in a free particulate form. For example, U.S. patent application Ser. No. 12/847,228 discloses encapsulating absorbent material particles with a removable encapsulant embedded in the filaments defining a tow fiber. However, further advancements in filter elements and apparatuses and methods for producing the same may be desirable.

SUMMARY OF THE DISCLOSURE

In one embodiment a method for forming a cigarette filter element is provided. The method may comprise providing a first fiber defining a first characteristic, providing a second fiber defining a second characteristic wherein the first characteristic of the first fiber differs from the second characteristic of the second fiber, combining the first fiber and the second fiber in a texturing apparatus such that the first fiber is at least partially entangled with the second fiber to form a mixed fiber product, and at least partially enclosing the mixed fiber product in a plug wrap.

In some embodiments combining the first fiber and the second fiber in the texturing apparatus may comprise directing at least one flow of fluid at the first fiber and the second fiber. Directing the flow of fluid at the first fiber and the second fiber may comprise directing a flow of air at the first fiber and the second fiber. The first fiber may define a cross-sectional area, finish, denier, and/or material composition that differs from the second fiber. The first fiber defines a finish that differs from the second fiber. The first fiber may comprise at least one of cellulose ester and polyolefin. The second fiber may be selected from the group consisting of cotton, regenerated cellulose, polylactic acid, polyhydroxyalkanoate, activated carbon fibers, catalytic fibers, cellulose ester, polyolefin, and ion-exchange fibers.

Further, in some embodiments the first fiber may define a material composition that is the same as the second fiber. Prior to combining the first fiber and the second fiber in the texturing apparatus, the first fiber may define a tow and the second fiber may define a second tow, or the first fiber may define a tow and the second fiber may define a yarn. The method may further comprise providing a first intermediate fiber, providing a second intermediate fiber, and combining the first intermediate fiber and the second intermediate fiber in an intermediate texturing apparatus such that the first intermediate fiber is at least partially entangled with the second intermediate fiber to form the first fiber. The intermediate texturing apparatus may be the texturing apparatus. Additionally, combining the first fiber and the second fiber in the texturing apparatus may comprise false twisting the first fiber and the second fiber. The method may also include applying a plasticizer to the mixed fiber product.

In some embodiments a first portion of the mixed fiber product may define a first melting point that is less than a second melting point of a second portion of the mixed fiber product. The method may further comprise heating the mixed fiber product to a temperature that is greater than or equal to the first melting point and less than the second melting point. The first fiber may define the first portion and the second fiber may define the second portion in one embodiment. In another embodiment the first fiber may define the first portion and at least part of the second portion.

In another embodiment a filter element is provided. The filter element may comprise a mixed fiber product comprising a first fiber defining a first characteristic and a second fiber defining a second characteristic, wherein the first characteristic of the first fiber differs from the second characteristic of the second fiber and the first fiber is at least partially entangled with the second fiber by a texturing apparatus. The filter element may further comprise a plug wrap.

In some embodiments the first fiber may define a cross-sectional area, finish, denier, and/or material composition that differs from the second fiber. The first fiber may comprise at least one of cellulose ester and polyolefin. The second fiber may be selected from a group consisting of cotton, regenerated cellulose, polylactic acid, polyhydroxyalkanoate, activated carbon fibers, catalytic fibers, cellulose ester, polyolefin, and ion-exchange fibers. The first fiber may define a material composition that is the same as the second fiber. At least one of the first fiber and the second fiber may be biodegradable. The filter element may further comprise a plasticizer. A first portion of the mixed fiber product may define a first melting point that is less than a second melting point of a second portion of the mixed fiber product.

In another embodiment a system configured for use in the manufacture of cigarettes is provided. The system may include a texturing apparatus configured to receive a first fiber defining a first characteristic and receive a second fiber defining a second characteristic, wherein the first characteristic of the first fiber differs from the second characteristic of the second fiber. Further, the texturing apparatus may be configured to combine the first fiber and the second fiber such that the first fiber is at least partially entangled with the second fiber and the first fiber and the second fiber form a mixed fiber product. The system may also include a rod maker configured to receive and wrap the mixed fiber product with a plug wrap to form a filter element.

In some embodiments the texturing apparatus may be further configured to direct at least one flow of fluid at the first fiber and the second fiber in order to combine the first fiber and the second fiber. The flow of fluid may comprise a flow of air. The texturing apparatus may be further configured to receive the first fiber in the form of a tow and the second fiber in the form of a second tow and/or receive the first fiber in the form of a tow and the second fiber in the form of a yarn. The texturing apparatus may also be configured to false twist the first fiber and the second fiber in order to combine the first fiber and the second fiber. The system may additionally include a plasticizer apparatus configured to apply a plasticizer to the mixed fiber product. Further, the system may include a cigarette maker configured to receive the filter element, attach the filter element to a smokable rod, and wrap the filter element and the smokable rod with a tipping material. The system may also include a heater configured to heat the mixed fiber product to a temperature that is greater than or equal to a first melting point of a first portion of the mixed fiber product and less than a second melting point of a second portion of the mixed fiber product.

In another embodiment a cigarette is provided. The cigarette may comprise a rod of smokable material, a filter element comprising a mixed fiber product, the filter element being attached to an end of the rod of smokable material, and a tipping material that circumscribes the rod of smokable material and the filter element. The mixed fiber product may comprise a first fiber defining a first characteristic and a second fiber defining a second characteristic, the first characteristic of the first fiber may differ from the second characteristic of the second fiber, and the first fiber may be at least partially entangled with the second fiber by a texturing apparatus.

In some embodiments the first fiber may define a cross-sectional area, finish, denier, and/or material composition that differs from the second fiber. The first fiber may comprise at least one of cellulose ester and polyolefin. The second fiber may be selected from a group consisting of cotton, regenerated cellulose, polylactic acid, polyhydroxyalkanoate, activated carbon fibers, catalytic fibers, cellulose ester, polyolefin, and ion-exchange fibers. The first fiber may define a material composition that is the same as the second fiber. At least one of the first fiber and the second fiber may be biodegradable. A first portion of the mixed fiber product may define a first melting point that is less than a second melting point of a second portion of the mixed fiber product.

Other aspects and advantages of the present invention will become apparent from the following.

BRIEF DESCRIPTION OF THE DRAWINGS

In order to assist the understanding of embodiments of the disclosure, reference will now be made to the appended drawings, which are not necessarily drawn to scale. The drawings are exemplary only, and should not be construed as limiting the disclosure.

DETAILED DESCRIPTION OF THE PREFERRED EMBODIMENTS

The present disclosure now will be described more fully hereinafter with reference to the accompanying drawings. The disclosure may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural references unless the context clearly dictates otherwise.

As described herein, embodiments of the disclosure relate to mixed fiber products configured for use in the manufacture of cigarette filter elements and method and apparatuses for the production thereof. By way of comparison, in the traditional production of cigarettes, one tow fiber is typically employed to form the filter element. A tow fiber, as used herein, refers to a substantially untwisted bundle of two or more substantially continuous filaments of a fiber. The material composition of the fibers forming the tow fiber may vary depending on the desired characteristics of the filter element which is produced from the tow fiber. For example, the fibers forming the tow fiber may comprise cellulose acetate, which may be employed for taste and filtering characteristics associated therewith.

Tow fiber may be produced, in one example embodiment, by spinning a dope, which may comprise a solution of a polymer (e.g., cellulose acetate) and a solvent (e.g., acetone), into a plurality of filaments. The filaments may be taken up, lubricated, and formed into a tow fiber by bundling the filaments. The tow fiber may then be crimped in order to increase the volume of the tow fiber. Further, the tow fiber may be dried and bailed for shipment to a filter element manufacturer.

Figure 1:
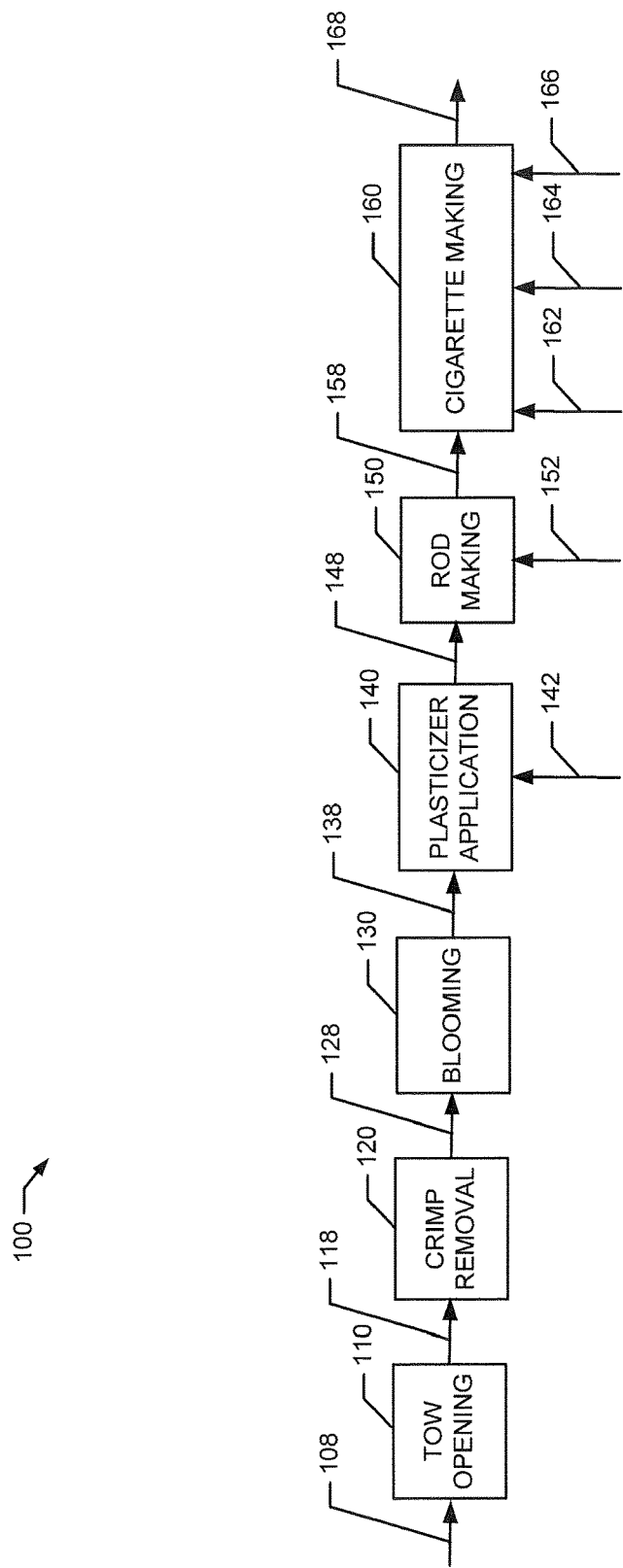
FIG. 1 is a schematic view of a prior art system for producing cigarettes according to an example embodiment.

In this regard, FIG. 1 illustrates an example embodiment of a system 100 configured to produce cigarettes or other smoking articles with operations performed by the system illustrated schematically. As illustrated, the system 100 may receive as an input a tow fiber 108, which may be produced according to the above-described manufacturing process or various other manufacturing processes. The tow fiber 108 may be subjected to tow opening at operation 110. Tow opening refers to one or more processes whereby the tow fiber 108 is spread out. In this regard, the tow fiber 108 may be initially packaged in a bale or packing in another manner whereby each filament forming the tow fiber is substantially in continuous contact with those filaments adjacent thereto. In one embodiment, tow opening at operation 110 may be conducted by a pneumatic banding jet that flattens and spreads the tow fiber 108 and forms a spread tow 118. However, various other techniques may be employed in other embodiments to produce the spread tow 118.

The system 100 may be further configured to conduct crimp removal on the spread tow 118 at operation 120. Crimp removal at operation 120 may involve stretching the spread tow fiber 118 to form a decrimped tow 128. Crimp removal may be conducted by directing the spread tow 118 through one or more cooperating sets of rollers with circumferential grooves in some embodiments.

The decrimped tow 128 may be subjected to blooming at operation 130. Blooming may involve introducing further separation between the filaments defining the tow. Blooming at operation 130 may be conducted through a variety of techniques, such as tensioning and relaxing alternating sections of the tow using rollers. Alternatively or additionally, one or more pneumatic banding jets may be employed to bloom the tow.

In this regard, the tow opening, crimp removal, and blooming operations 110, 120, 130 all refer to operations whereby the filaments defining the tow fiber 108 are at least partially separated from one another. Separating the filaments defining the tow fiber 108 in this manner ultimately produces a bloomed tow 138. Thus, the term "bloomed tow," as used herein refers to tow fibers that have been at least partially separated through one or more of tow opening, crimp removal, and blooming operations 110, 120, 130. In this regard, tow opening, crimp removal, and/or blooming operations 110, 120, 130 may occur substantially simultaneously and/or involve use of the same equipment. For example, tow opening at operation 110 and blooming at operation 130 may both occur via use of one or more pneumatic banding jets. Alternatively, or additionally, crimp removal at operation 120 and blooming at operation 130 may both occur via use of grooved rollers.

Thus, while the tow opening, crimp removal, and blooming operations 110, 120, 130 are illustrated and generally described above as being separate operations, it should be understood that there may be overlap between one or more of these operations, or one or more of these operations may be omitted. In this regard, the term "tow separation," as used herein, may refer to one or more of tow opening, crimp removal and blooming operations 110, 120, 130, which results in bloomed tow 138, as defined above.

The system 100 may subject the bloomed tow 138 to plasticizer application at operation 140. Plasticizer application may involve applying (e.g., via spraying or wick application) a plasticizer 142 to the bloomed tow 138 to produce a plasticized fiber product 148. Plasticizer application at operation 140 may be conducted for the purpose of ultimately bonding the filaments of the tow to one another to produce a relatively firm and rigid structure configured to not soften or collapse during smoking. The tow separation operations described above are configured to improve the penetration of the plasticizer 142 by creating gaps between the filaments defining the bloomed tow 138 through which the plasticizer may travel.

The plasticizer 142, which may in some embodiments comprise triacetin and/or carbowax, may be applied to the bloomed tow 138 in traditional amounts using known techniques. In one embodiment, the plasticizer 142 may comprise triacetin and carbowax in a 1:1 ratio by weight. The total amount of plasticizer 142 may be generally about 4 to about 20 percent by weight, preferably about 6 to about 12 percent by weight of the filter material. Other suitable materials or additives used in connection with the construction of the filter element will be readily apparent to those skilled in the art of cigarette filter design and manufacture. See, for example, U.S. Pat. No. 5,387,285 to Rivers, which is incorporated herein by reference.

The plasticized fiber product 148 may then be subjected to one or more rod making operations 150. Rod making operations 150 may include shaping of the plasticized fiber product 148. For example, the plasticized fiber product 148 may be compressed or otherwise shaped to form a continuous cylindrical rod shape.

The rod making operations 150 may additionally include cutting the plasticized fiber product 148 into segments. In this regard, the plasticized fiber product 148 may be longitudinally subdivided into cylindrical shaped filter segments. In some embodiments the length of the filter segments may be selected based on a desired length of the filter element for a single cigarette. By way of further example, in another embodiment the filter segments may be cut to lengths which are equivalent to two times the length of the filter element for a single cigarette, and the filter segment may be cut in two at a later time. For example, the filter segment may connect two rods of tobacco, and the filter segment may be divided to form the filters for two cigarettes.

The measurements of filter segments depend on the particular application thereof, but typically filter segments for cigarettes may range in length from about 80 mm to about 140 mm, and from about 16 mm to about 27 mm in circumference. For example, a typical filter segment having a 100 mm length and a 24.53 mm circumference may exhibit a pressure drop of from about 200 mm to about 400 mm of water as determined at an airflow rate of 17.5 cubic centimeters per second (cc/sec.) using an encapsulated pressure drop tester, sold commercially as Model No. FTS-300 by Filtrona Corporation, Richmond, Va.

Rod making at operation 150 may also include wrapping the plasticized fiber product 148 with a plug wrap 152 in some embodiments. The plasticized fiber product 148 may be wrapped with the plug wrap 152 such that each end of the filter material remains exposed. The plug wrap 152 can vary. See, for example, U.S. Pat. No. 4,174,719 to Martin. Typically, the plug wrap 152 is a porous or non-porous paper material. Suitable plug wrap materials are commercially available. Exemplary plug wrap papers ranging in porosity from about 1100 CORESTA units to about 26000 CORESTA units are available from Schweitzer-Maudit International as Porowrap 17-M1, 33-M1, 45-M1, 70-M9, 95-M9, 150-M4, 150-M9, 240M9S, 260-M4 and 260-M4T; and from Miquel-y-Costas as 22HP90 and 22HP150. Non-porous plug wrap materials typically exhibit porosities of less than about 40 CORESTA units, and often less than about 20 CORESTA units. Exemplary non-porous plug wrap papers are available from Olsany Facility (OP Paprina) of the Czech Republic as PW646; Wattenspapier of Austria as FY/33060; Miquel-y-Costas of Spain as 646; and Schweitzer-Mauduit International as MR650 and 180. Plug wrap paper can be coated, particularly on the surface that faces the plasticized fiber product 148, with a layer of a film-forming material. Such a coating can be provided using a suitable polymeric film-forming agent (e.g., ethylcellulose, ethylcellulose mixed with calcium carbonate, nitrocellulose, nitrocellulose mixed with calcium carbonate, or a so-called lip release coating composition of the type commonly employed for cigarette manufacture). Alternatively, a plastic film (e.g., a polypropylene film) can be used as a plug wrap material. For example, non-porous polypropylene materials that are available as ZNA-20 and ZNA-25 from Treofan Germany GmbH & Co. KG can be employed as plug wrap materials.

If desired, so-called "non-wrapped acetate" filter segments may also be produced. Such segments are produced using the types of techniques generally set forth herein. However, rather than employing a plug wrap 152 that circumscribes the longitudinally extending periphery of the filter material, a somewhat rigid rod is provided, for example, by applying steam to the shaped plasticized fiber product 148. Techniques for commercially manufacturing non-wrapped acetate filter rods are possessed by Filtrona Corporation, Richmond, Va.

Accordingly, shaped, cut, and/or wrapped (or non-wrapped) filter elements 158 may be produced by the rod making operation(s) 150. The system 100 may further conduct cigarette making operations 160. The cigarette making operations 160 may include wrapping a supply of smokable material 162 with wrapping material 164 to form a smokable rod.

The smokable material 162 employed in manufacture of the smokable rod can vary. For example, the smokable material 162 can have the form of filler (e.g., such as tobacco cut filler). As used herein, the terms "filler" or "cut filler" are meant to include tobacco materials and other smokable materials which have a form suitable for use in the manufacture of smokable rods. As such, filler can include smokable materials which are blended and are in a form ready for cigarette manufacturer. The filler materials normally are employed in the form of strands or shreds as is common in conventional cigarette manufacture. For example, the cut filler material can be employed in the form of strands or shreds from sheet-like or "strip" materials which are cut into widths ranging from about $\frac{1}{20}$ inch to about $\frac{1}{60}$ inch, preferably from about $\frac{1}{25}$ inch to about $\frac{1}{35}$ inch. Generally, such strands or shreds have lengths which range from about 0.25 inch to about 3 inches.

Examples of suitable types of tobacco materials include flue-cured, Burley, Maryland or Oriental tobaccos, rare or specialty tobaccos, and blends thereof. The tobacco material can be provided in the form of tobacco lamina; processed tobacco, processed tobacco stems such as cut-rolled or cut-puffed stems, reconstituted tobacco materials; or blends thereof. The smokable material 162 or blend of smokable materials may consist essentially of tobacco filler material. Smokable materials 162 can also be cased and top dressed as is conventionally performed during various stages of cigarette manufacture.

Typically, the smokable rod has a length which ranges from about 35 mm to about 85 mm, preferably about 40 to about 70 mm; and a circumference of about 17 mm to about 27 mm, preferably about 22.5 mm to about 25 mm Short cigarette rods (i.e., having lengths from about 35 to about 50 mm) can be employed, particularly when smokable blends having a relatively high packing density are employed.

The wrapping material 164 can vary, and typically is a cigarette wrapping material having a low air permeability value. For example, such wrapping materials 164 can have air permeabilities of less than about 5 CORESTA units. Such wrapping materials 164 include a cellulosic base web (e.g., provided from wood pulp and/or flax fibers) and inorganic filler material (e.g., calcium carbonate and/or magnesium hydroxide particles). A suitable wrapping material 164 is a cigarette paper consisting essentially of calcium carbonate and flax. Particularly preferred wrapping materials 164 include an amount of a polymeric film forming agent sufficient to provide a desirably low air permeability. Exemplary wrapping materials 164 are P-2540-80, P-2540-81, P-2540-82, P-2540-83, P-2540-84, and P-2831-102 available from Kimberly-Clark Corporation and TOD 03816, TOD 05504, TOD 05560 and TOD 05551 available from Ecusta Corporation.

The packing densities of the blend of smokable materials 162 contained within the wrapping materials 164 can vary. Typical packing densities for smokable rods may range from about 150 to about 300 mg/cm3. Normally, packing densities of the smokable rods range from about 200 to about 280 mg/cm3.

Further, the cigarette making operations 160 may include attaching the filter element 158 to the smokable rod. For example, the filter element 158 and a portion of the smokable rod may be circumscribed by a tipping material 166 with an adhesive configured to bind to the filter element and the tobacco rod so as to couple the filter element to an end of the tobacco rod.

Typically, the tipping material 166 circumscribes the filter element 158 and an adjacent region of the smokable rod such that the tipping material extends about 3 mm to about 6 mm along the length of the smokable rod. Typically, the tipping material 166 is a conventional paper tipping material. The tipping material 166 can have a permeability which can vary. For example, the tipping material 166 can be essentially air impermeable, air permeable, or be treated (e.g., by mechanical or laser perforation techniques) so as to have a region of perforations, openings or vents thereby providing a means for providing air dilution to the cigarette. The total surface area of the perforations and the positioning of the perforations along the periphery of the cigarette can be varied in order to control the performance characteristics of the cigarette.

Accordingly, cigarettes 168 (or other smokable articles) may be produced in accordance with the above-described example embodiments, or under various other embodiments of systems and methods for producing cigarettes. As described above, known manufacturing methods and apparatuses are conventionally configured to employ only a single filter tow as an input in the formation of the filter element. However, it may be desirable to incorporate more than one material into the filter element for various purposes such as improved particulate filtration, vapor absorption, and/or biodegradability.

Modification of known equipment configured to manufacture filter elements to accept two fibers as an input may present challenges. For example, known equipment does not include features that provide for mixing of two input fibers to form the filter. Accordingly, applicant herein presents methods and apparatuses for improved filter elements that incorporate two or more fibers that may define differing characteristics.

Figure 2:
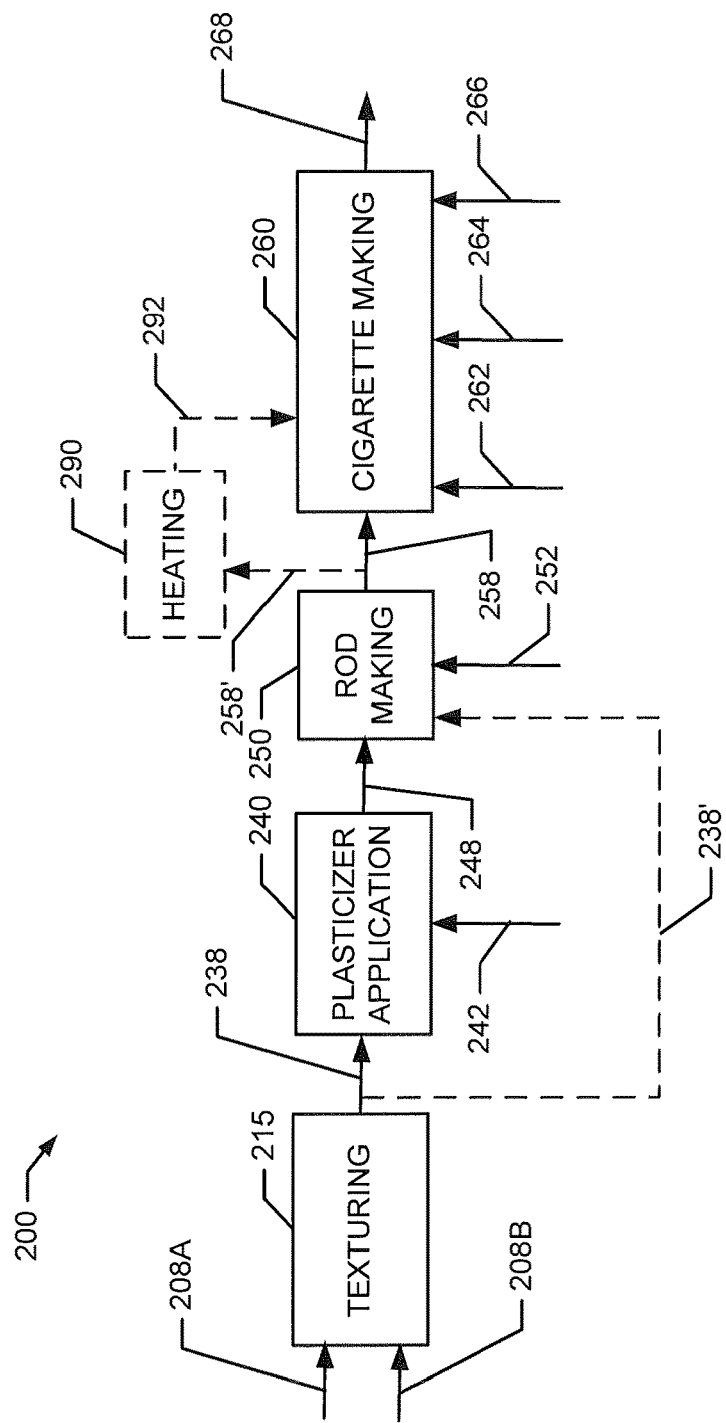
FIG. 2 is a schematic view of a system of operations configured to employ texturing operations in the production of cigarettes according to an example embodiment.

In this regard, FIG. 2 illustrates an example embodiment of a system 200 of operations configured to produce cigarettes or other smoking articles with operations performed by the system illustrated schematically. In particular, the system 200 is configured to form a mixed fiber product from multiple fibers. The mixed fiber may be employed in the formation of filter elements which may then be incorporated into cigarettes or other smoking articles. Although the system 200 is illustrated as including sequential operations, the operations need not necessarily occur in the order shown. Further, the system may include fewer or a greater number of operations in some embodiments.

As illustrated in FIG. 2, the system 200 may be configured to receive inputs of multiple fibers, which may be continuous in some embodiments. The fibers may be processed by the system 200 to form filter elements. In the illustrated embodiment, a first fiber 208A and a second fiber 208B are received as inputs that are processed to form filter elements. However, various other numbers of fibers may be employed in other embodiments, such as 2 to about 10 different fibers (e.g., 2, 3, 4, 5, 6, 7, 8, 9, or 10 different fibers). Thus, although the description appearing below generally describes specific numbers of fibers employed to form filter elements, it should be understood that this description is provided for exemplary purposes, and various other numbers of fibers may be employed in other embodiments.

The first fiber 208A may define one or more characteristics (referred to herein as the "first characteristic(s)") and the second fiber 208B may define one or more characteristics (referred to herein as the "second characteristic(s)"). One or more characteristics of the fibers 208A, 208B may be the same, or one or more of the characteristics may differ. The fibers 208A, 208B may define various characteristics, as may be understood by one having skill in the art.

One characteristic is the form in which the fibers 208A, 208B are initially provided. For example, one or both of the fibers 208A, 208B may define a tow (i.e., a number of substantially parallel filaments). In another embodiment, one or both of the fibers 208A, 208B may define a yarn (i.e., a twisted bundle of filaments, which may or may not be continuous). Thus, by way of non-limiting examples, a yarn may be combined with a tow, a yarn may be combined with a yarn, or a tow may be combined with a tow.

The material composition of the fibers 208A, 208B may also vary depending on the desired properties of the filter element which is produced from the fibers. The two fibers 208A, 208B may include the same material composition, or different materials compositions. In one example embodiment, one or both of the fibers 208A, 208B may comprise a cellulose ester (e.g., cellulose acetate) or polyolefin (e.g., polypropylene), or the like. While these material compositions are commonly used, one or both of the fibers 208A, 208B may alternatively or additionally define a different material composition than those described above. In this regard, certain material compositions may have properties that are desirable alone or in combination with fibers of differing material compositions. For example, the material compositions of the fibers 208A, 208B may be selected based on improved biodegradability, improved particulate filtration, and/or improved vapor absorption. Vapor absorption, as used herein, refers to changing the chemical composition of mainstream smoke through physical or chemical sorption of gaseous components of mainstream smoke.

In this regard, the fibers 208A, 208B can be characterized in certain embodiments as having different filtration properties or exhibiting different levels of biodegradability. By combining such fibers in the same filter element using the apparatuses, systems, and methods of the present disclosure, the overall level of biodegradability of the filter element can be adjusted to a desired level or the filtration efficiency with respect to specific solid or gaseous components of mainstream smoke can be adjusted as desired. Examples of combinations of fiber types exhibiting different filtration characteristics can be found, for example, in U.S. patent application Ser. No. 12/847,228 to Sebastian, filed Jul. 30, 2010.

In certain embodiments, at least one of the fibers 208A, 208B can be characterized as degradable. One exemplary type of degradation is biodegradation. The term "biodegradable" as used in reference to a degradable polymer refers to a polymer that degrades under aerobic and/or anaerobic conditions in the presence of bacteria, fungi, algae, and other microorganisms into carbon dioxide/methane, water and biomass, although materials containing heteroatoms can also yield other products such as ammonia or sulfur dioxide. "Biomass" generally refers to the portion of the metabolized materials incorporated into the cellular structure of the organisms present or converted to humus fractions indistinguishable from material of biological origin.

Biodegradability can be measured, for example, by placing a sample in environmental conditions expected to lead to decomposition, such as placing a sample in water, a microbe-containing solution, a compost material, or soil. The degree of degradation can be characterized by weight loss of the sample over a given period of exposure to the environmental conditions. Exemplary rates of degradation for certain filter element embodiments of the invention include a weight loss of at least about 20% after burial in soil for 60 days or a weight loss of at least about 30% after 15 days of exposure to a typical municipal composter. However, rates of biodegradation can vary widely depending on the type of degradable particles used, the remaining composition of the filter element, and the environmental conditions associated with the degradation test. U.S. Pat. No. 5,970,988 to Buchanan et al. and U.S. Pat. No. 6,571,802 to Yamashita provide exemplary test conditions for degradation testing. The degradability of a plastic material also may be determined using one or more of the following ASTM test methods: D5338, D5526, D5988, and D6400.

Exemplary biodegradable materials that can be used in a fibrous form in the present invention include aliphatic polyesters, cellulose acetate fibers with imbedded starch particles, polyvinyl alcohol, starch, aliphatic polyurethanes, polyesteramides, cis-polyisoprene, cis-polybutadiene, polyanhydrides, and copolymers and blends thereof. Additional examples of biodegradable materials include thermoplastic cellulose, available from Toray Industries, Inc. of Japan and described in U.S. Pat. No. 6,984,631 to Aranishi et al., which is incorporated by reference herein, and thermoplastic polyesters such as Ecoflex® aliphatic-aromatic copolyester materials available from BASF Corporation or poly(ester urethane) polymers described in U.S. Pat. No. 6,087,465 to Seppälä et al., which is incorporated by reference herein in its entirety. Any of these biodegradable fibers can further include a cellulose acetate coating on the outer surface thereof.

Exemplary aliphatic polyesters advantageously used in the present invention have the structure —[C(O)—R—O]$_n$—, wherein n is an integer representing the number of monomer units in the polymer chain and R is an aliphatic hydrocarbon, preferably a C1-C10 alkylene, more preferably a C1-C6 alkylene (e.g., methylene, ethylene, propylene, isopropylene, butylene, isobutylene, and the like), wherein the alkylene group can be a straight chain or branched. Exemplary aliphatic polyesters include polyglycolic acid (PGA), polylactic acid (PLA) (e.g., poly(L-lactic acid) or poly(DL-lactic acid)), polyhydroxyalkanoates (PHAs) such as polyhydroxypropionate, polyhydroxyvalerate, polyhydroxybutyrate, polyhydroxyhexanoate, and polyhydroxyoctanoate, polycaprolactone (PCL), polybutylene succinate adipate and copolymers thereof (e.g., polyhydroxybutyrate-co-hydroxyvalerate (PHBV)).

Various degradable materials suitable for use in the present invention are set forth, for example, in US Pat. Appl. Pub. Nos. 2009/0288669 to Hutchens, 2011/0036366 to Sebastian; and U.S. patent application Ser. No. 12/827,618 to Sebastian et al., filed Jun. 30, 2010, Ser. No. 12/847,228 to Sebastian, filed Jul. 30, 2010, and Ser. No. 13/194,063 to Sebastian et al., filed Jul. 29, 2011, all of which are incorporated by reference herein.

The fibers 208A, 208B can also be selected from carbon fibers, ion exchange fibers, and catalytic fibers. Carbon fibers can be described as fibers obtained by the controlled pyrolysis of a precursor fiber. Sources of carbon fibers include Toray Industries, Toho Tenax, Mitsubishi, Sumitomo Corporation, Hexcel Corp., Cytec Industries, Zoltek Companies, and SGL Group. Exemplary commercially available carbon fibers include ACF-1603-15 and ACF-1603-20 available from American Kynol, Inc. Examples of starting materials, methods of preparing carbon-containing fibers, and types of carbon-containing fibers are disclosed in U.S. Pat. No. 3,319,629 to Chamberlain; U.S. Pat. No. 3,413,982 to Sublett et al.; U.S. Pat. No. 3,904,577 to Buisson; U.S. Pat. No. 4,281,671 to Bynre et al.; U.S. Pat. No. 4,876,078 to Arakawa et al.; U.S. Pat. No. 4,947,874 to Brooks et al.; U.S. Pat. No. 5,230,960 to Iizuka; U.S. Pat. No. 5,268,158 to Paul, Jr.; U.S. Pat. No. 5,338,605 to Noland et al.; U.S. Pat. No. 5,446,005 to Endo; U.S. Pat. No. 5,482,773 to Bair; U.S. Pat. No. 5,536,486 to Nagata et al.; U.S. Pat. No. 5,622,190 to Arterbery et al.; and U.S. Pat. No. 7,223,376 to Panter et al.; and U.S. Pat. Publication Nos. 2003/0200973 to Xue et al.; 2006/0201524 to Zhang et al. 2006/0231113 to Newbery et al., and 2009/0288672 to Hutchens, all of which are incorporated herein by reference.

Ion exchange fibers are fibers capable of ion exchange with gas phase components of mainstream smoke from a smoking article. Such fibers are typically constructed by imbedding particles of an ion exchange material into the fiber structure or coating the fiber with an ion exchange resin. The amount of ion exchange material present in the fiber can vary, but is typically about 10 to about 50 percent by weight, based on the total weight of the ion exchange fiber, more often about 20 to about 40 percent by weight. Exemplary ion exchange fibers are described in U.S. Pat. No. 3,944,485 to Rembaum et al. and U.S. Pat. No. 6,706,361 to Economy et al, both of which are incorporated by reference herein. Ion exchange fibers are commercially available from Fiban of Belarus. Exemplary products from Fiban include FIBAN A-1 (monofunctional strong base fiber with —N$^+$(CH$_3$)$_3$Cl$^-$ functional group), FIBAN AK-22-1 (polyfunctional fiber with ≡N, =NH, and —COOH functional groups), FIBAN K-1 (monofunctional strong acid fiber with —SO$_3^-$H$^+$ functional group), FIBAN K-3 (polyfunctional fiber with —COOH, —NH$_2$, and =NH functional groups), FIBAN K-4 (monofunctional weak acid fiber with —COOH functional group), FIBAN X-1 (iminodiacetic fiber) FIBAN K-1-1 (strong acid fiber similar to FIBAN K-1 modified by potassium-cobalt-ferrocyanide), FIBAN A-5 (polyfunctional fiber with —N(CH$_3$)$_2$, =NH, and —COOH functional groups), FIBAN A-6 and A-7 (polyfunctional fiber with strong and weak base amine groups), FIBAN AK-22B (polyfunctional fiber similar to FIBAN K-3), and FIBAN S (monofunctional fiber with [FeOH]$^{2+}$ functional group).

Catalytic fibers are fibers capable of catalyzing the reaction of one or more gas phase components of mainstream smoke, thereby reducing or eliminating the presence of the gas phase component in the smoke drawn through the filter element. Exemplary catalytic fibers catalyze oxidation of one or more gaseous species present in mainstream smoke, such as carbon monoxide, nitrogen oxides, hydrogen cyanide, catechol, hydroquinone, or certain phenols. The oxidation catalyst used in the invention is typically a catalytic metal compound (e.g., metal oxides such as iron oxides, copper oxide, zinc oxide, and cerium oxide) that oxidizes one or more gaseous species of mainstream smoke. Exemplary catalytic metal compounds are described in U.S. Pat. No. 4,182,348 to Seehofer et al.; U.S. Pat. No. 4,317,460 to Dale et al.; U.S. Pat. No. 4,956,330 to Elliott et al.; U.S. Pat. No. 5,050,621 to Creighton et al.; U.S. Pat. No. 5,258,340 to Augustine et al.; U.S. Pat. No. 6,503,475 to McCormick; U.S. Pat. No. 6,503,475 to McCormick, U.S. Pat. No. 7,011,096 to Li et al.; U.S. Pat. No. 7,152,609 to Li et al.; U.S. Pat. No. 7,165,553 to Luan et al.; U.S. Pat. No. 7,228,862 to Hajaligol et al.; U.S. Pat. No. 7,509,961 to Saoud et al.; U.S. Pat. No. 7,549,427 to Dellinger et al.; U.S. Pat. No. 7,560,410 to Pillai et al.; and U.S. Pat. No. 7,566,681 to Bock et al.; and US Pat. Publication Nos. 2002/0167118 to Billiet et al.; 2002/0172826 to Yadav et al.; 2002/0194958 to Lee et al.; 2002/014453 to Lilly Jr., et al.; 2003/0000538 to Bereman et al.; 2005/0274390 to Banerjee et al.; 2007/0215168 to Banerjee et al.; 2007/0251658 to Gedevanishvili et al.; 2010/0065075 to Banerjee et al.; 2010/0125039 to Banerjee et al.; and 2010/0122708 to Sears et al., all of which are incorporated by reference herein in their entirety. Catalytic fibers can be constructed by, for example, imbedding particles of a catalytic material into the fiber structure or coating the fiber with a catalytic material, such as metal oxide particles. The amount of catalytic material present in the fiber can vary, but is typically about 10 to about 50 percent by weight, based on the total weight of the ion exchange fiber, more often about 20 to about 40 percent by weight. PCT Application No. WO 1993/005868, also incorporated herein by reference, describes the use of catalytic fibers formed by coating a surface-treated hopcalite material, which is a material including both copper oxides and manganese oxides available from the North Carolina Center for Research located in Morrisville, N.C., onto a fibrous support.

By way of example, cotton and/or regenerated cellulose having ion exchange groups introduced thereto may be employed, for example, as an ion-exchange fiber configured for vapor absorption. By way of further example, polylactic acid and/or polyhydroxyalkanoate may be employed as one or more fibers for improved biodegradability. Activated carbon fibers may also be employed for improved particle filtration and/or improved vapor absorption. The fibers 208A, 208B may include any other fibers, which may be selected for improved biodegradability, improved particulate filtration, improved vapor absorption, and/or any other beneficial aspect associated with the fibers. For further examples, see the material compositions set forth in U.S. Pat. No. 3,424,172 to Neurath; U.S. Pat. No. 4,811,745 to Cohen et al.; U.S. Pat. No. 4,925,602 to Hill et al.; U.S. Pat. No. 5,225,277 to Takegawa et al.; and U.S. Pat. No. 5,271,419 to Arzonico et al.; each of which is incorporated herein by reference. In one example embodiment, the first fiber 208A may comprise a cellulose ester such as cellulose acetate, or polyolefin, and the second fiber 208B may comprise cotton, regenerated cellulose, polylactic acid, polyhydroxyalkanoate, activated carbon fibers, catalytic fibers, a cellulose ester such as cellulose acetate, polyolefin, and/or ion-exchange fibers. Thereby, for example, the aspects of cellulose acetate that may be desirable (e.g., taste and filtration) may be retained while offering other functionality (e.g., improved biodegradability, improved particulate filtration, and/or improved vapor absorption).

Other characteristics of the fibers 208A, 208B include the denier thereof. The filaments defining the fibers 208A, 208B can vary in denier per filament (i.e., "dpf") and the total denier of the fibers 208A, 208B may also vary. Denier per filament is a measurement of the weight per unit length of the individual filaments of the fibers 208A, 208B, and can be manipulated to achieve a desired pressure drop across the filter element produced from the fibers. An exemplary dpf range for the filaments comprising the fibers 208A, 208B may be about 1.5 to about 8 where denier is expressed in units of grams/9000 meters. An exemplary range of total denier for the fibers 208A, 208B may be about 10,000 to about 50,000 (e.g., about 15,000 or about 40,000 total denier). The denier per filament and/or the total denier may be the same or different for each of the fibers 208A, 208B.

Additional characteristics of the fibers 208A, 208B, include the size and shape of the fibers and the filaments defining the fibers. The sizes and shapes of the fibers 208A, 208B may be the same or different. For example, the fibers 208A, 208B may be provided in various overall cross-sectional shapes and/or the individual filaments defining the fibers may be provided in various cross-sectional shapes. Further, various overall sizes of the fibers 208A, 208B may be employed as well as various sizes of the individual filaments defining the fibers. Thus, for example, the first fiber 208A may define one or more cross-sectional areas that differ from, or are the same as, the cross-sectional areas of the second fiber 208B. In this regard, an overall cross-sectional area of the first fiber 208A may be the same as, or different from, the overall cross-sectional area of the second fiber 208B, and the cross-sectional areas of the individual filaments defining the first fiber may be the same as, or different from the cross-sectional areas of the individual filaments defining the second fiber.

Another characteristic of the fibers 208A, 208B, is that of the finish applied thereto. For example, during the manufacture of the fibers 208A, 208B, the same finish or a different finish may be applied to the fibers. An additional characteristic of the fibers 208A, 208b that may be the same or different is that of the melting point thereof. Accordingly, one or more of the above-described characteristics and/or various other characteristics of the fibers 208A, 208B may be the same or different.

As illustrated in FIG. 2, the fibers 208A, 208B may be subjected to texturing at operation 215. Texturing, as used herein, refers to combining fibers in a texturing apparatus such that the fibers are at least partially entangled with one another. More particularly, texturing refers to applying mechanical force to fibers to entangle the fibers. For example, the mechanical force may be applied to the fibers through directing a fluid such as air at the fibers in order to entangle the fibers. In this regard, in the system 200 illustrated in FIG. 2, the texturing operation 215 at least partially entangles the first fiber 208A with the second fiber 208B to create a mixed fiber product 238. Thus, the mixed fiber product 238 may define the characteristics of both of all of the fibers 208A, 208B that are combined to form the mixed fiber product.

Figure 3:
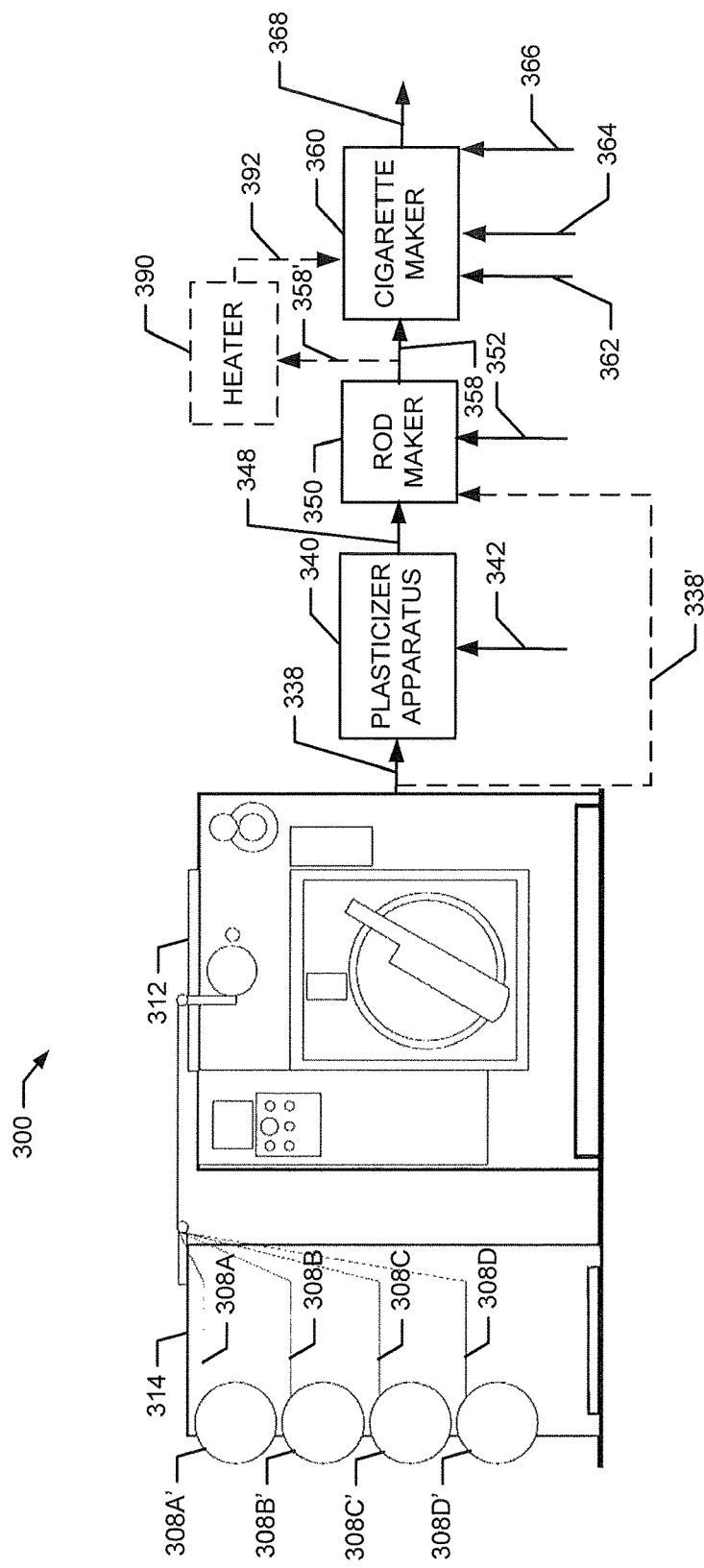
FIG. 3 is a schematic view of system for forming a cigarette including a texturing apparatus and creel configured to combine fibers to form a mixed fiber product according to an example embodiment.

An example embodiment of a texturing apparatus 312, which may perform texturing operations is illustrated as part of a system for forming cigarettes 300 in FIG. 3 (with apparatuses forming the system illustrated schematically). In the embodiment illustrated in FIG. 3, the texturing apparatus 312 is configured to receive four fibers 308A-D, although various other numbers of fibers may be employed in other embodiments. As illustrated, in some embodiments the texturing apparatus 312 may receive the fibers 308A-D from a creel 314. The creel 314 may include a plurality of bobbins 308A'-D', which respectively hold and supply the fibers 308A-D to the texturing apparatus 312. The fibers 308A-D may be received in the form of a yarn, tow, individual filaments, or other form as may be understood.

As noted above, the texturing apparatus 312 may be configured to receive the fibers 308A-D and combine the fibers such that the fibers are at least partially entangled with each other in order to form a mixed fiber product 338. The texturing apparatus 312 may employ a variety of operations to entangle the fibers 308A-D. In this regard, as noted above, texturing may involve applying mechanical force to the fibers 308A-D in order to entangle the fibers. For example, the texturing apparatus 312 may be configured to direct at least one flow of fluid at the fibers 308A-D in order to combine the fibers. In one embodiment the flow of fluid may comprise a flow of air that is directed by one or more jets (e.g., nozzles) at the fibers 308A-D. Thereby, the texturing apparatus 312 may entangle the fibers 308A-D. In one example embodiment, the texturing apparatus 312 may false twist the fibers 308A-D in order to combine the fibers. False twisting of the fibers 308A-D may involve twisting the fibers together, thermosetting the twisted fibers, and drawing (i.e., stretching) the fibers in one example embodiment. An exemplary embodiment of a texturing apparatus suitable for use in the present invention is the AIRTEX™ jet texturing machine manufactured by TECHNISERVICE®, Inc. of Kennett Square, Pa. Further examples of texturing and texturing apparatuses are described in U.S. Pat. No. 4,125,922 to Irwin; U.S. Pat. No. 3,553,953 to Ponson; U.S. Pat. No. 3,381,346 to Benson; U.S. Pat. No. 3,328,863 to Cobb; U.S. Pat. No. 3,253,396 to Fish; U.S. Pat. No. 4,559,772 to Heinrich et al.; U.S. Pat. No. 4,338,776 to Krenzer; and U.S. Pat. No. 4,068,358 to Luther; each of which is incorporated herein by reference.

The texturing apparatus 312 may be employed to produce a mixed fiber product 338 directly from the fibers 308A-D. In this regard, the total sum of the deniers of the fibers 308A-D received by the texturing apparatus 312 may be selected to be equal to a desired denier of the mixed fiber product 338. For example, the creel 314 may include enough bobbins 308A'-D' to accommodate fibers 308A-D defining a total denier equal to a desired denier of the mixed fiber product 338.

However, in one embodiment an intermediate texturing apparatus may be employed in the formation of the mixed fiber product 338. For example, intermediate fibers may be provided and then combined in an intermediate texturing apparatus such that the intermediate fibers are at least partially entangled with each other. Thereby, the intermediate fibers may be combined to form one of the fibers 308A-D that may then be combined to form the mixed fiber product. By separating the process into two steps in this manner, the number of fibers 308A-D directly supplied to the texturing apparatus 312 may be reduced. Accordingly, the creel 314 may include fewer bobbins 308A'-D'.

In some embodiments the texturing apparatus 312 may function as the intermediate texturing apparatus that forms the intermediate fibers and also as the texturing apparatus that forms the final mixed fiber product 338. In this regard, the texturing apparatus 312 may first combine the intermediate fibers to form one or more of the fibers 308A-D, and then the texturing apparatus may combine the fibers 308A-D to form the mixed fiber product 338. For example, one of the fibers 308A-D may be stored after formation from the intermediate fibers, and then once all of the fibers 308A-D are formed, they may be combined by the same texturing apparatus to form the mixed fiber product 338. However, as noted above, in an alternate embodiment one or more separate intermediate texturing apparatuses may be employed to form the fibers 308A-D, or the creel 314 may be configured to supply fibers having a total denier equal to a desired denier of the mixed fiber product 338. Accordingly, the desired denier of the mixed fiber product 338 may be achieved in a variety of manners using one or more texturing apparatuses.

Thus, a mixed fiber product may be produced by a texturing apparatus as described above. As illustrated in FIG. 2, a mixed fiber product 238 resulting from the above-described texturing operations 215 may be subjected to plasticizer application at operation 240. The plasticizer 242 may be applied to the mixed fiber product 238 by a traditional plasticizer apparatus as described above. However, the system 200 illustrated in FIG. 2 may differ from existing embodiments of systems configured to manufacture cigarettes in that the separation operations (e.g., tow opening, crimp removal, and blooming) may not be necessary. This may be possible because the texturing apparatus may combine the fibers 208A, 208B in the manner described above such that the fibers are entangled (so as to provide a substantially evenly mixed distribution of the fibers) and sufficiently separated such that the plasticizer 242 may penetrate the mixed fiber product 238.

Accordingly, embodiments of the system 200 employing texturing operations 215 performed by a texturing apparatus may provide benefits both in terms of allowing for combination of multiple fibers 208A, 208B, and in terms of reducing the number of operations required to produce the filter elements. Further, the operations performed after production of the mixed fiber product 238 may be substantially the same as those performed in traditional systems for producing smoking articles. Thus, existing cigarette production equipment may be utilized. For example, the plasticized fiber product 248 may be subjected to one or more rod making operations 250 in which the plasticized fiber product is wrapped with a plug wrap 252. Then, the filter element 258 may be employed in one or more cigarette making operations 260. For example, smokable material 262 may be wrapped with wrapping material 264 to form a smokable rod, and the filter element 258 and the smokable rod may be coupled to the filter element via wrapping thereof with tipping material 266 to form cigarettes 268 or other smokable articles. Accordingly, the above-described system 200 may employ a texturing apparatus to combine two or more fibers 208A, 208B while avoiding the need for separation operations (e.g., tow opening, crimp removal, and blooming) since the mixed fiber product 238 produced by the texturing apparatus may resemble bloomed tow.

Returning to FIG. 3, the system for forming cigarettes 300 may also include other apparatuses and components that correspond with the operations discussed above in relation to FIG. 2. In this regard, the mixed fiber product 338 exiting the texturing apparatus 312 may enter a plasticizer apparatus 340 in which plasticizer 342 is applied to the mixed fiber product. The system 300 may further include a rod maker 350 that receives the plasticized fiber product 348 and wraps it with a plug wrap 352 to form a filter element 358. Further, the system 300 may include a cigarette maker 360 that attaches a smokable rod formed from smokable material 362 wrapped with wrapping material 364 to the filter element 358 with tipping material 366. Accordingly, the system for forming cigarettes 300 may include various apparatuses that perform the operations described above with respect to FIG. 2 to form cigarettes 368.

Other embodiments of the system 200 of operations configured to produce cigarettes or other smoking articles of FIG. 2 and the system 300 of apparatuses for forming cigarettes of FIG. 3 are also provided. In this regard, in some embodiments the systems 200, 300 may include a heater 390 configured to conduct a heating operation 290. For example, the heating operation may be conducted on the mixed fiber product 238', 338' before or after it is formed into the filter element 258', 358'. As illustrated, in some embodiments the systems 200, 300 may not include a plasticizer apparatus 340 or a corresponding plasticizer application operation 240. Accordingly, in some embodiments the mixed fiber product 238', 338' may be directed to the rod maker 350 and subjected to rod making operations 250 and then heated without first being subjected to plasticizer application 240 by a plasticizer apparatus 340.

In this regard, in some embodiments a first portion of the mixed fiber product 238', 338' may define a melting point (e.g., the "first melting point") that is less than a melting point of a second portion of the mixed fiber product 238', 338' (e.g., the "second melting point"). The first portion with the first, lower melting point may comprise polyethylene, polypropylene, polylactic acid, ethylene vinyl acetate, or other material composition configured to have a lower melting point than the second portion. In some embodiments the first melting point may be from about 100° C. to about 150° C., and preferably about 120° C., with the second portion having a melting from about 160° C. to about 260° C., and preferably about 170° C. In some embodiments the melting point of the first portion may be configured to be from about 25° C. to about 100° C. less than the melting point of the second portion, and preferably about 50° C. less than the melting point of the second portion, so as to enable melting the first portion without melting the second portion.

In some embodiments the first portion may comprise from about 5% to about 40%, and preferably about 25% of the total mass or volume of the mixed fiber product 238', 338'. In this regard, the first portion may be employed to bind the mixed fiber product 238', 338' together and/or bind the mixed fiber product to the plug wrap 252, 352. However, the filter element 258', 358' may need to allow flow therethrough. Accordingly, the percentage of the mixed fiber product 238', 338' that is melted may be limited so as to allow for flow therethrough without unduly increasing the pressure drop associated therewith.

In some embodiments a first fiber may define the first portion with the first melting point, and a second fiber may define the second portion with the second melting point. Accordingly, when the first fiber and the second fiber are entangled, formed into a mixed fiber product 238', 338', wrapped with a plug wrap 252, 352 to form a filter element 258', 358' and directed through the heater 390 and subjected to heating at operation 290, the first fiber may at least partially melt to bind the first fiber to the second fiber and/or to the plug wrap. As illustrated in FIGS. 2 and 3, the heater 390 may conduct the heating operation 290 after the rod maker 350 conducts the rod making operation 250 in which the mixed fiber product 238', 338' is wrapped with the plug wrap 252, 352. However, in other embodiments, heating may be conducted prior to wrapping the mixed fiber product with a plug wrap. Further, although the systems 200, 300 are illustrated as bypassing the plasticizer application operation 240 by the plasticizer apparatus 340, in some embodiments the plasticizer may also be applied to the mixed fiber product, in addition to conducting the heating operation 290 with the heater 390.

Figure 4:
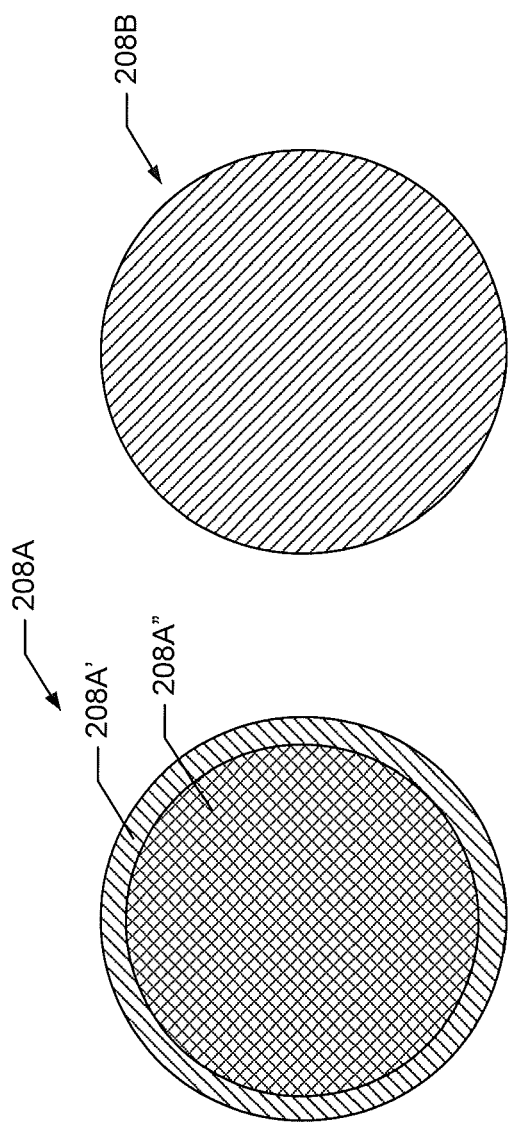
FIG. 4 is a cross-sectional view through first and second fibers, wherein the first fiber comprises a first section that differs from a second section.

As noted above, in some embodiments the fibers may define differing melting points. In another embodiment one or more of the fibers may define both the first portion with the first melting point and at least part of the second portion with the second melting point. For example, FIG. 4 illustrates an embodiment in which a first fiber 208A defines a first section 208A' and a second section 208A", with one of the sections defining a lower melting point than the other section. In particular, the first section 208A' may define the first melting point, which is lower than the melting point of the second section 208A". Accordingly, the heater 390 may subject the mixed fiber product 238', 338' (e.g., embodied as the filter element 258', 358') to a heating operation 290 that heats the fibers to a temperature that is great than the first melting point of the first section 208A' of the first fiber 208A, but lower than the melting point of the second section 208A" of the first fiber. A second fiber 208B may also have a melting point that is higher than the melting point of the first section 208A' of the first fiber 208A. Accordingly, the first section 208A' of the first fiber 208A may be melted without melting the second section 208A" of the first fiber or the second fiber 208B. As illustrated, in some embodiments the first section 208A' of the first fiber 208A may define a sheath that surrounds a core defined by the second section 208A". Returning to FIGS. 2 and 3, the heater 390 and the corresponding heating operation 290 may comprise a variety of configurations. For example, the heater 390 may comprise a conventional oven, an infrared heater, a microwave, or any other apparatus configured to impart heat to the fibers to melt a portion thereof. With further regard to microwaves, the use of microwave heating may provide shorter melting times and more efficient heating through the application of microwave energy tuned to the most efficient absorption frequencies for the fiber (or the section of the fiber) that is configured to melt. Microwave energy heating is independent of the thermal conductivity of the material being heated. In conjunction with use of microwave energy, in certain embodiments, the fiber (or the section of the fiber) that is configured to melt may be formulated with a polar additive, such as a salt material, to enhance the heating effect derived from the microwave energy. Exemplary microwave heating systems are available from Lambda Technologies of Morrisville, N.C. Microwave heating systems are also described in US Pat. Appl. Pub. No. 2007/0284034 to Fathi et al., which is incorporated by reference herein. Thus, variable frequency microwaves and/or other heaters may be employed to heat the filter fibers and produce a melted filter element 292, 392 in some embodiments.

Figure 5:
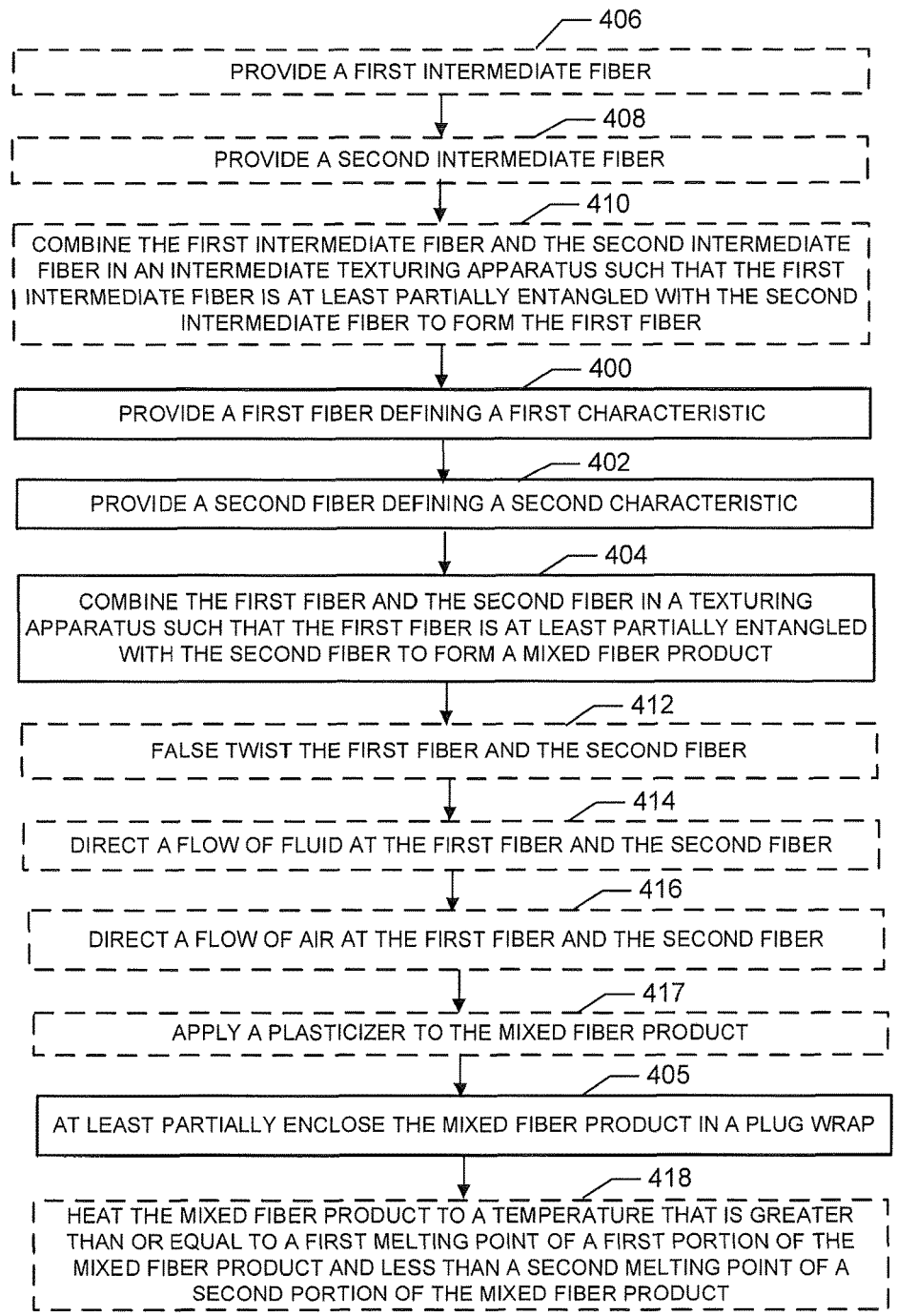
FIG. 5 is a block diagram of a method for forming a cigarette filter element according to an example embodiment.

Embodiments of related methods are also provided. In this regard, FIG. 5 illustrates an example embodiment of a method for forming a cigarette filter element. As illustrated, the method may include providing a first fiber defining a characteristic at operation 400, providing a second fiber defining a second characteristic at operation 402, combining the first fiber and the second fiber in a texturing apparatus such that the first fiber is at least partially entangled with the second fiber to form a mixed fiber product at operation 404, and at least partially enclosing the mixed fiber product in a plug wrap at operation 405. In some embodiments the first characteristic of the first fiber may differ from the second characteristic of the second fiber, whereas in other embodiments the characteristics may be the same.

In some embodiments certain ones of the above-described operations, as shown in solid lines, may be modified or combined with other operations. These additional operations are illustrated in dashed lines. For example, the method may further include providing a first intermediate fiber at operation 406, providing a second intermediate fiber at operation 408, and combining the first intermediate fiber and the second intermediate fiber in an intermediate texturing apparatus such that the first intermediate fiber is at least partially entangled with the second intermediate fiber to form the first fiber at operation 410. Although not illustrated, the second fiber may be formed in the same manner or a similar manner.

Further, combining the first fiber and the second fiber in a texturing apparatus at operation 404 may comprise false twisting the first fiber and the second fiber at operation 412. Additionally, combining the first fiber and the second fiber in a texturing apparatus at operation 404 may comprise directing at least one flow of fluid at the first fiber and the second fiber at operation 414. Also, directing the flow of fluid at the first fiber and the second fiber at operation 414 may comprise directing a flow of air at the first fiber and the second fiber at operation 416. For example, false twisting may employ directing an air jet at the fibers. The method may also include applying a plasticizer to the mixed fiber product to form a plasticized fiber product at operation 417. Further, in some embodiments a first portion of the mixed fiber product may define a first melting point that is less than a second melting point of a second portion of the mixed fiber product. Thus, the method may also include heating the mixed fiber product to a temperature that is greater than or equal to the first melting point and less than the second melting point at operation 418.

Cigarette making operations 160, 260 described above may be conducted using a conventional automated cigarette rod making machine. Exemplary cigarette rod making machines are of the type commercially available from Molins PLC or Hauni-Werke Korber & Co. KG. For example, cigarette rod making machines of the type known as MIA (commercially available from Molins PLC) or PROTOS (commercially available from Hauni-Werke Korber & Co. KG) can be employed. A description of a PROTOS cigarette making machine is provided in U.S. Pat. No. 4,474,190 to Brand, at col. 5, line 48 through col. 8, line 3, which is incorporated herein by reference. Types of equipment suitable for the manufacture of cigarettes also are set forth in U.S. Pat. No. 4,781,203 to La Hue; U.S. Pat. No. 4,844,100 to Holznagel; U.S. Pat. No. 5,131,416 to Gentry; U.S. Pat. No. 5,156,169 to Holmes et al.; U.S. Pat. No. 5,191,906 to Myracle, Jr. et al.; U.S. Pat. No. 6,647,878 to Blau et al.; U.S. Pat. No. 6,848,449 to Kitao et al.; and U.S. Pat. No. 6,904,917 to Kitao et al.; and US Pat. Appl. Pub. Nos. 2003/0145866 to Hartman; 2004/0129281 to Hancock et al.; 2005/0039764 to Barnes et al.; and 2005/0076929 to Fitzgerald et al.; each of which is incorporated herein by reference. Filter elements produced in accordance with this disclosure may be incorporated within conventional cigarettes configured for combustion of a smokable material, and also within the types of cigarettes set forth in U.S. Pat. No. 4,756,318 to Clearman et al.; U.S. Pat. No. 4,714,082 to Banerjee et al.; U.S. Pat. No. 4,771,795 to White et al.; U.S. Pat. No. 4,793,365 to Sensabaugh et al.; U.S. Pat. No. 4,989,619 to Clearman et al.; U.S. Pat. No. 4,917,128 to Clearman et al.; U.S. Pat. No. 4,961,438 to Korte; U.S. Pat. No. 4,966,171 to Serrano et al.; U.S. Pat. No. 4,969,476 to Bale et al.; U.S. Pat. No. 4,991,606 to Serrano et al.; U.S. Pat. No. 5,020,548 to Farrier et al.; U.S. Pat. No. 5,027,836 to Shannon et al.; U.S. Pat. No. 5,033,483 to Clearman et al.; U.S. Pat. No. 5,040,551 to Schlatter et al.; U.S. Pat. No. 5,050,621 to Creighton et al.; U.S. Pat. No. 5,052,413 to Baker et al.; U.S. Pat. No. 5,065,776 to Lawson; U.S. Pat. No. 5,076,296 to Nystrom et al.; U.S. Pat. No. 5,076,297 to Farrier et al.; U.S. Pat. No. 5,099,861 to Clearman et al.; U.S. Pat. No. 5,105,835 to Drewett et al.; U.S. Pat. No. 5,105,837 to Barnes et al.; U.S. Pat. No. 5,115,820 to Hauser et al.; U.S. Pat. No. 5,148,821 to Best et al.; U.S. Pat. No. 5,159,940 to Hayward et al.; U.S. Pat. No. 5,178,167 to Riggs et al.; U.S. Pat. No. 5,183,062 to Clearman et al.; U.S. Pat. No. 5,211,684 to Shannon et al.; U.S. Pat. No. 5,240,014 to Deevi et al.; U.S. Pat. No. 5,240,016 to Nichols et al.; U.S. Pat. No. 5,345,955 to Clearman et al.; U.S. Pat. No. 5,396,911 to Casey, III et al.; U.S. Pat. No. 5,551,451 to Riggs et al.; U.S. Pat. No. 5,595,577 to Bensalem et al.; U.S. Pat. No. 5,727,571 to Meiring et al.; U.S. Pat. No. 5,819,751 to Barnes et al.; U.S. Pat. No. 6,089,857 to Matsuura et al.; U.S. Pat. No. 6,095,152 to Beven et al; and U.S. Pat. No. 6,578,584 to Beven; which are incorporated herein by reference. Still further, filter elements produced in accordance with the description provided above may be incorporated within the types of cigarettes that have been commercially marketed under the brand names "Premier" and "Eclipse" by R. J. Reynolds Tobacco Company. See, for example, those types of cigarettes described in Chemical and Biological Studies on New Cigarette Prototypes that Heat Instead of Burn Tobacco, R. J. Reynolds Tobacco Company Monograph (1988) and Inhalation Toxicology, 12:5, p. 1-58 (2000); which are incorporated herein by reference.

Figure 6:
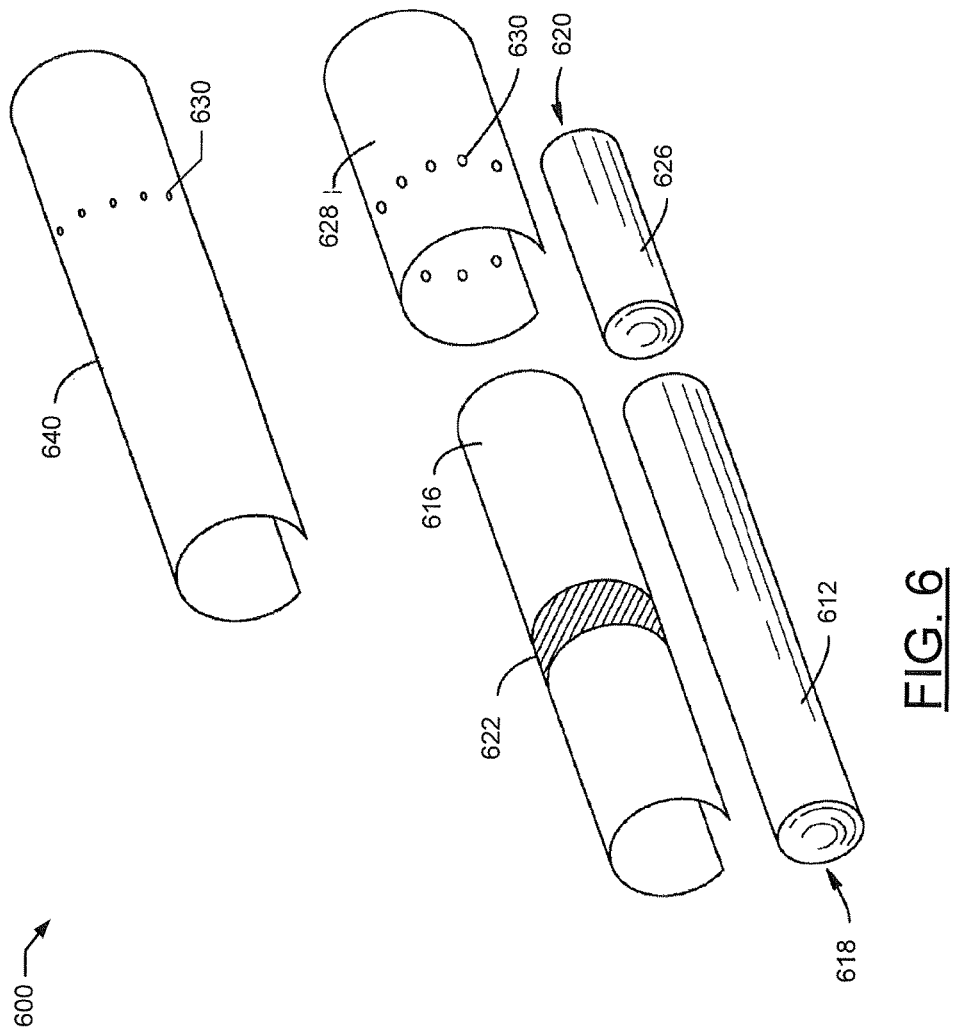
FIG. 6 is an exploded view of an example embodiment of a cigarette produced in accordance with the systems, methods, and apparatuses disclosed herein.

For example, FIG. 6 illustrates an exploded view of a smoking article in the form of a cigarette 600 that may be produced by the apparatuses, systems, and methods disclosed herein. The cigarette 600 includes a generally cylindrical rod 612 of a charge or roll of smokable filler material contained in a circumscribing wrapping material 616. The rod 612 is conventionally referred to as a "tobacco rod." The ends of the tobacco rod 612 are open to expose the smokable filler material. The cigarette 600 is shown as having one optional band 622 (e.g., a printed coating including a film-forming agent, such as starch, ethylcellulose, or sodium alginate) applied to the wrapping material 616, and that band circumscribes the cigarette rod 612 in a direction transverse to the longitudinal axis of the cigarette 600. That is, the band 622 provides a cross-directional region relative to the longitudinal axis of the cigarette 600. The band 622 can be printed on the inner surface of the wrapping material 616 (i.e., facing the smokable filler material), or less preferably, on the outer surface of the wrapping material. Although the cigarette can possess a wrapping material having one optional band, the cigarette also can possess wrapping material having further optional spaced bands numbering two, three, or more.

At one end of the tobacco rod 612 is the lighting end 618, and at the mouth end 620 is positioned a plasticized and/or melted fiber product 626. The plasticized and/or melted fiber product 626 may be produced by the apparatuses, systems, and methods disclosed herein. In this regard, the plasticized and/or melted fiber product 626 may comprise an embodiment of the above-described mixed fiber product comprising a first fiber defining a first characteristic and a second fiber defining a second characteristic to which a plasticizer has been applied and/or a portion of the mixed fiber product has been melted. Thus, the plasticized and/or melted fiber product 626 may be produced by a texturing operation conducted by a texturing apparatus and plasticizer application operation performed by a plasticizer apparatus and/or a heating operation performed by a heater.

The plasticized and/or melted fiber product 626 may have a generally cylindrical shape, and the diameter thereof may be essentially equal to the diameter of the tobacco rod 612. The plasticized and/or melted fiber product 626 is circumscribed along its outer circumference or longitudinal periphery by a layer of outer plug wrap 628 to form a filter element. The filter element is positioned adjacent one end of the tobacco rod 612 such that the filter element and tobacco rod are axially aligned in an end-to-end relationship, preferably abutting one another. The ends of the filter element permit the passage of air and smoke therethrough.

A ventilated or air diluted smoking article can be provided with an optional air dilution means, such as a series of perforations 630, each of which extend through the tipping material 640 and plug wrap 628. The optional perforations 630 can be made by various techniques known to those of ordinary skill in the art, such as laser perforation techniques. Alternatively, so-called off-line air dilution techniques can be used (e.g., through the use of porous paper plug wrap and pre-perforated tipping material). For cigarettes that are air diluted or ventilated, the amount or degree of air dilution or ventilation can vary. Frequently, the amount of air dilution for an air diluted cigarette is greater than about 10 percent, generally is greater than about 20 percent, often is greater than about 30 percent, and sometimes is greater than about 40 percent. Typically, the upper level for air dilution for an air diluted cigarette is less than about 80 percent, and often is less than about 70 percent. As used herein, the term "air dilution" is the ratio (expressed as a percentage) of the volume of air drawn through the air dilution means to the total volume and air and smoke drawn through the cigarette and exiting the extreme mouth end portion of the cigarette. The plasticized and/or melted fiber product 626 may be attached to the tobacco rod 612 using the tipping material 640 (e.g., essentially air impermeable tipping material), that circumscribes both the entire length of the filter element and an adjacent region of the tobacco rod 612. The inner surface of the tipping material 640 is fixedly secured to the outer surface of the plug wrap 628 and the outer surface of the wrapping material 616 of the tobacco rod, using a suitable adhesive; and hence, the filter element and the tobacco rod are connected to one another to form the cigarette 600.

The components and operation of conventional automated cigarette making machines will be readily apparent to those skilled in the art of cigarette making machinery design and operation. For example, descriptions of the components and operation of several types of chimneys, tobacco filler supply equipment, suction conveyor systems and garniture systems are set forth in U.S. Pat. No. 3,288,147 to Molins et al.; U.S. Pat. No. 3,915,176 to Heitmann et al.; U.S. Pat. No. 4,291,713 to Frank; U.S. Pat. No. 4,574,816 to Rudszinat; U.S. Pat. No. 4,736,754 to Heitmann et al. U.S. Pat. No. 4,878,506 to Pinck et al.; U.S. Pat. No. 5,060,665 to Heitmann; U.S. Pat. No. 5,012,823 to Keritsis et al. and U.S. Pat. No. 6,360,751 to Fagg et al.; and US Pat. Appl. Pub. No. 2003/0136419 to Muller; each of which is incorporated herein by reference. The automated cigarette making machines of the type set forth herein provide a formed continuous cigarette rod (or other smokable rod) that can be subdivided into formed smokable rods of desired lengths.

Many modifications and other embodiments of the disclosure will come to mind to one skilled in the art to which this disclosure pertains having the benefit of the teachings presented in the foregoing description; and it will be apparent to those skilled in the art that variations and modifications of the present disclosure can be made without departing from the scope or spirit of the disclosure. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for forming a cigarette filter element, the method comprising:
    providing a first fiber defining a first characteristic;
    providing a second fiber defining a second characteristic,
        wherein the first fiber and the second fiber respectively comprise a plurality of filaments, and
        wherein the first characteristic of the first fiber differs from the second characteristic of the second fiber;
    combining the first fiber and the second fiber in a texturing apparatus such that the first fiber is at least partially entangled with the second fiber to form a mixed fiber product without conducting a separate separation operation in which the filaments of the first fiber or the filaments of the second fiber are at least partially separated from one another prior to the first fiber and the second fiber being combined in the texturing apparatus;
    applying the plasticizer to the mixed fiber product; and
    at least partially enclosing the mixed fiber product in a plug wrap.

2. The method of claim 1, wherein combining the first fiber and the second fiber in the texturing apparatus comprises directing at least one flow of fluid at the first fiber and the second fiber.

3. The method of claim 2, wherein directing the flow of fluid at the first fiber and the second fiber comprises directing a flow of air at the first fiber and the second fiber.

4. The method of claim 1, wherein the first fiber defines a cross-sectional area that differs from the second fiber.

5. The method of claim 1, wherein the first fiber defines a finish that differs from the second fiber.

6. The method of claim 1, wherein the first fiber defines a material composition that differs from the second fiber.

7. The method of claim 1, wherein the first fiber comprises at least one of cellulose ester and polyolefin.

8. The method of claim 7, wherein the second fiber is selected from the group consisting of:
    cotton;
    regenerated cellulose;
    polylactic acid;
    polyhydroxyalkanoate;
    activated carbon fibers;
    catalytic fibers;
    cellulose ester;
    polyolefin; and
    ion-exchange fibers.

9. The method of claim 1, wherein the first fiber defines a material composition that is the same as the second fiber.

10. The method of claim 1, wherein the first fiber defines a denier that differs from the second fiber.

11. The method of claim 1, wherein prior to combining the first fiber and the second fiber in the texturing apparatus, the first fiber defines a tow and the second fiber defines a second tow.

12. The method of claim 1, wherein prior to combining the first fiber and the second fiber in the texturing apparatus the first fiber defines a tow and the second fiber defines a yarn.

13. The method of claim 1, further comprising:
providing a first intermediate fiber;
providing a second intermediate fiber; and
combining the first intermediate fiber and the second intermediate fiber in an intermediate texturing apparatus such that the first intermediate fiber is at least partially entangled with the second intermediate fiber to form the first fiber.

14. The method of claim 1, wherein combining the first fiber and the second fiber in the texturing apparatus comprises false twisting the first fiber and the second fiber.

15. The method of claim 1, wherein a first portion of the mixed fiber product defines a first melting point that is less than a second melting point of a second portion of the mixed fiber product.

16. The method of claim 15, further comprising heating the mixed fiber product to a temperature that is greater than or equal to the first melting point and less than the second melting point.

17. The method of claim 16, wherein the first fiber defines the first portion and the second fiber defines the second portion.

18. The method of claim 16, wherein the first fiber defines the first portion and at least part of the second portion.

19. The method of claim 1, wherein the mixed fiber product is not subjected to tow opening, crimp removal, or blooming prior to applying the plasticizer.

20. The method of claim 1, wherein applying the plasticizer to the mixed fiber product comprises applying a fluid plasticizer to the mixed fiber product.

21. A method for forming a cigarette filter element, the method comprising:
providing a first fiber defining a first characteristic;
providing a second fiber defining a second characteristic, wherein the first characteristic of the first fiber differs from the second characteristic of the second fiber;
combining the first fiber and the second fiber in a texturing apparatus such that the first fiber is at least partially entangled with the second fiber to form a mixed fiber product, wherein combining the first fiber and the second fiber in the texturing apparatus comprises false twisting the first fiber and the second fiber; and
at least partially enclosing the mixed fiber product in a plug wrap.

* * * * *